United States Patent [19]
Hebert et al.

[11] Patent Number: 5,804,061
[45] Date of Patent: Sep. 8, 1998

[54] MULTIFLOW PRESSURIZED DEINKING APPARATUS

[75] Inventors: Richard P. Hebert, Cherry Valley; David B. Grimes, Greenfield, both of Mass.

[73] Assignee: Beloit Technologies, Inc., Wilmington, Del.

[21] Appl. No.: 993,474

[22] Filed: Dec. 18, 1997

Related U.S. Application Data

[62] Division of Ser. No. 834,606, Apr. 14, 1997.

[51] Int. Cl.$^6$ ............................... B03D 1/24; B03D 1/14
[52] U.S. Cl. .............................. 209/170; 209/168; 209/1; 210/221.2; 162/4
[58] Field of Search ................................ 209/170, 168, 209/1; 210/221.2; 162/4

[56] References Cited

U.S. PATENT DOCUMENTS

| | | |
|---|---|---|
| 2,730,190 | 1/1956 | Brown . |
| 2,766,203 | 10/1956 | Brown . |
| 4,186,094 | 1/1980 | Hellberg . |
| 4,190,522 | 2/1980 | Tra . |
| 4,288,319 | 9/1981 | Heijs . |
| 4,952,308 | 8/1990 | Chamberlin et al. ............ 209/170 |
| 5,273,624 | 12/1993 | Chamberlain et al. ............ 162/4 |
| 5,330,655 | 7/1994 | Schweiss . |
| 5,417,806 | 5/1995 | Matzke . |

FOREIGN PATENT DOCUMENTS

| | | |
|---|---|---|
| 1335147 | 4/1995 | Canada . |
| 1475631 | 6/1977 | United Kingdom . |

*Primary Examiner*—Thomas M. Lithgow
*Attorney, Agent, or Firm*—Lathrop & Clark

[57] ABSTRACT

A mixture of air and paper stock made from recycled paper from which the ink particles have been chemically released is injected into a cylindrical processing vessel. Added surfactants create a foam from the air as it rises through the stock and cause the ink particles to adhere to the air bubbles, resulting in a foam containing a concentrated fraction of the ink particles with some included fibers. The foam rises to the top of the vessel, and carries with it ink particles. Additional air injection ports can be used to increase the amount of foam generated and the amount of ink removed. Flow of stock and foam from the vessel can be controlled by adjusting valves on the stock and foam outlets. Flotation sensors allow the foam head to be maintained at the stock level by controlling the rate foam is withdrawn through the foam outlets.

16 Claims, 2 Drawing Sheets

MULTIFLOW PRESSURIZED DEINKING APPARATUS

CROSS REFERENCE TO RELATED APPLICATIONS

This application is a divisional application of Ser. No. 08/834,606 filed Apr. 14, 1997 (pending) entitled Multiflow Pressurized Deinking Model which is incorporated herein by reference.

FIELD OF THE INVENTION

The present invention relates generally to froth floatation separation and has particular use in the field of deinking of paper in a process for recycling waste paper. More specifically, the invention relates to an apparatus for separating ink-laden foam from a slurry of papermaking stock.

BACKGROUND OF THE INVENTION

The manufacture of paper from recycled paper waste, especially post-consumer waste, has become a major industry. Recycling efforts throughout the United States have made large quantities of recycled paper available. This, combined with the high cost of virgin wood fibers, has raised the economic importance of paper manufactured from recycled fibers.

The value of the paper manufactured from recycled fiber, like the value of paper manufactured from virgin fiber is dependent on the mechanical properties of the paper and the appearance of the paper. Appearance is chiefly measured in terms of brightness or lack of dark material in the paper manufactured from recycled fiber.

Of course the principal use of paper is for printing and the vast majority of all printed inks are based on carbon particles. Thus a pulp manufactured from recycled paper is typically contaminated with a substantial amount of particulate carbon. The carbon from printer's ink is chemically detached from the fiber and must be mechanically separated from the fiber if a high quality sheet is to be manufactured from the recycled stock.

There are three basic ways of cleaning recycled stock: washing the stock, using floatation separation techniques, and using hydrocyclones. Generally all three techniques are used.

Floatation separation techniques can be particularly advantageous, especially the techniques such as those disclosed in U.S. Pat. No. 5,273,624 which is incorporated herein by reference. The U.S. Pat. No. 5,273,624 shows how a sealed floatation chamber allows the use of vacuum or pressure within the chamber to simplify the collection and removal of the foam containing the carbon particles.

In general the floatation technique (long utilized in the mining industry) utilizes surfactants and various chemical additives to produce a stable foam or froth. The surfactants preferentially attach to the material to be separated and to the surface of a bubble of air, thus attaching the carbon particle to air bubbles introduced into the stock. The air rises through the pulp stock and is removed along with the carbon particles. Unlike the mining industry, where the material floated to a surface is the desired product, the floatation material in recycling paper is a waste product. Thus the controlling goal is complete removal of carbon from the paper stock and the loss of some fiber with the carbon contamination is acceptable and even desirable.

Although the systems disclosed in the U.S. Pat. No. 5,273,624 are a significant improvement on prior systems there is considerable economic incentive and need for systems which are more compact and efficient.

SUMMARY OF THE INVENTION

The pressurized floatation system of this invention utilizes a cylindrical processing vessel which has a conical inlet and a conical outlet. A mixture of air and paper stock made from recycled paper is injected into the inlet. The recycled stock contains ink particles which have been chemically released from the wood fibers. Surfactants which have been added to the stock create a foam from the air as it rises through the stock. The surfactants encourages the ink particles to adhere to the air bubbles, resulting in a foam containing a concentrated fraction of the ink particles with some included fibers. The foam, being lighter than the surrounding stock, rapidly rises to the top of the vessel, and carries with it ink particles removed from the stock. Because the foam rises so rapidly to the top of the vessel three additional air injection ports can be used to increase the amount of foam generated and the amount of ink removed from the stock. Because the vessel operates at a pressure different from atmospheric, flow of stock and foam from the vessel can be controlled by adjusting valves on the stock outlet and foam outlets.

In order for the floatation system to function properly a head of foam must be maintained at about the level of the paper stock so that only foam is removed from the foam outlets. This is accomplished by controlling the rate at which foam is withdraw through the foam outlets. Information to control the level of foam within the vessel is provided by floatation sensors. The flotation sensors have magnetic floats which move up and down rods which magnetically couple the floats to sensor magnets.

A system of baffles is also necessary to assure the proper functioning of the floatation system. Transverse baffles consisting of foraminous plates with numerous punched holes of about one-half inch diameter are positioned to create turbulence within the stock as it flows through the vessel. Collection baffle are positioned downstream of the foam outlets to collect foam below and in front of the foam outlets.

It is a feature of the present invention to provide a system for removing ink particles from recycled paper pulp which is more efficient.

It is another feature of the present invention to provide a system for removing ink particles from recycled paper pulp which is more compact.

It is a further feature of the present invention to provide a system for removing ink particles from recycled paper which utilizes less energy.

It is a yet further feature of the present invention to provide a system for removing ink particles from recycled paper pulp which requires a less complicated mechanical system.

Further objects, features and advantages of the invention will be apparent from the following detailed description when taken in conjunction with the accompanying drawings.

DESCRIPTION OF THE PREFERRED EMBODIMENT

Figure 1:
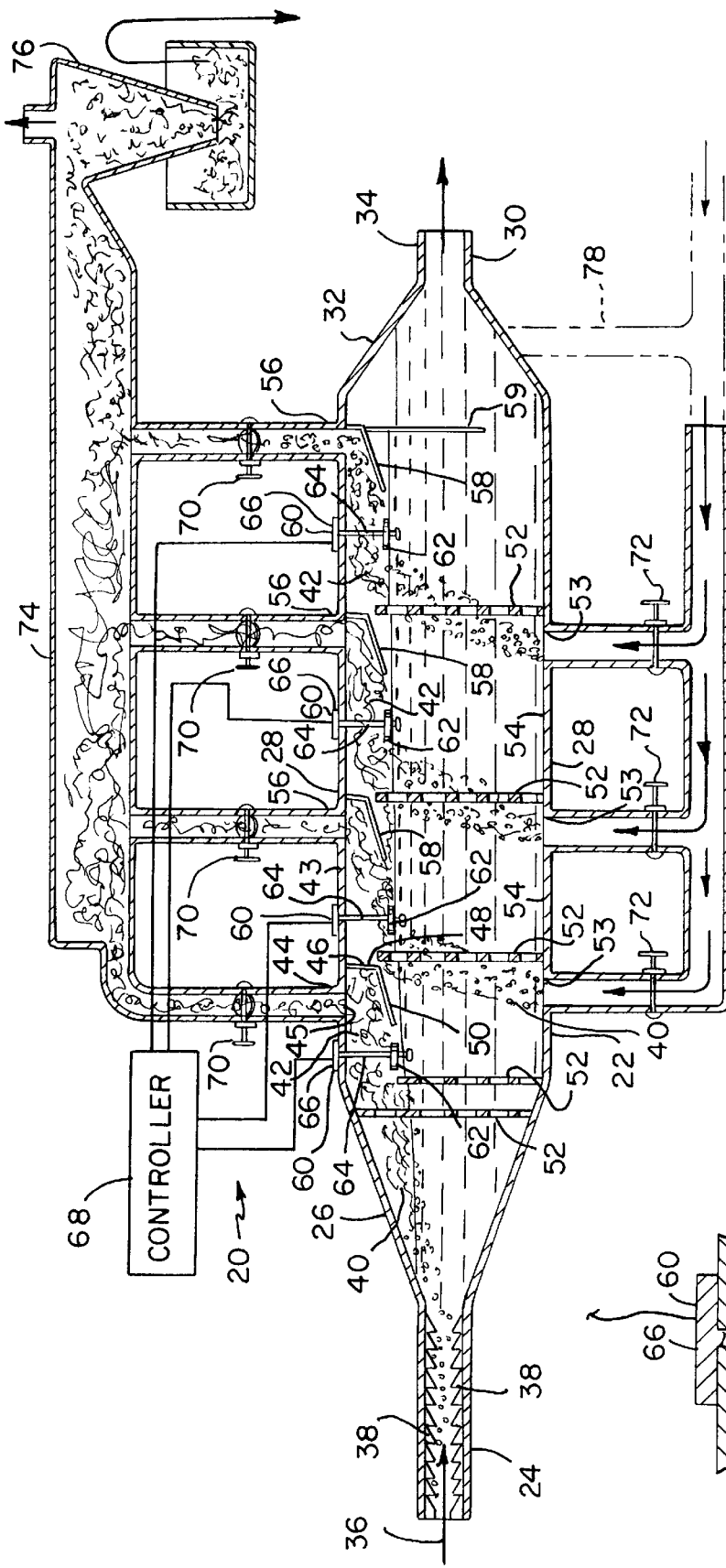
FIG. 1 is a schematic side elevational view of a pressurized floatation module of this invention.
Figure 2:
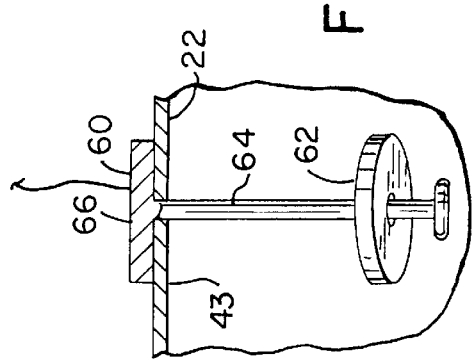
FIG. 2 is an enlarged fragmentary view of the float sensor of the apparatus of FIG. 1 taken along detail line 2—2.
Figure 3:
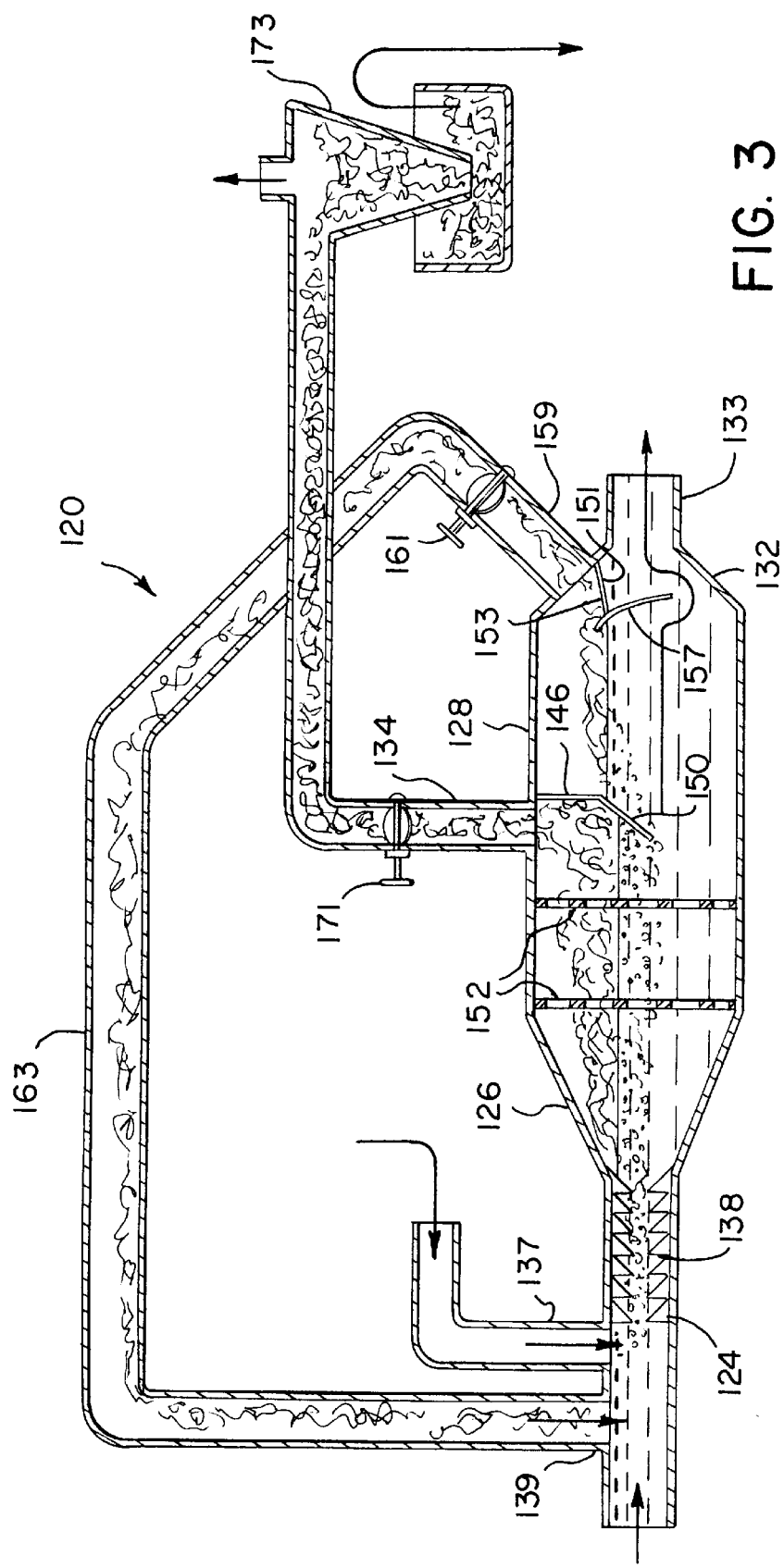
FIG. 3 is a schematic side elevational view of an alternative embodiment pressurized floatation module of this invention.

Referring more particularly to FIGS. 1–3 wherein like numbers refer to similar parts, a deinking foam floatation system 20 is shown in FIG. 1. In prior art floatation models only a single air supply was utilized, thereby limiting efficiency. In the system 20 a pressurized vessel 22 is utilized with an inlet pipe 24 which is connected to a conical inlet section 26. The inlet section 26 is connected to a cylindrical body section 28. The body section 28 has a downstream outlet 30 formed by a converging conical section 32 which is connected to an outlet pipe 34.

Stock indicated by arrows 36 flows into the vessel 22 from the inlet pipe 24. The stock contains 0.5 percent to about five percent paper fiber by weight. Air is also injected into the inlet pipe 24 along with the stock. Turbulence-inducing circumferential baffles 38 in the inlet pipe 24 may be used to increase the amount of mixing between the air and the stock. The air creates a foam 40 which is substantially lighter than the surrounding stock and so will rise rapidly to the top 43 of the vessel 22 forming a surface foam 42. The surface foam 42 is drawn through the top 43 of the vessel 22 through a foam outlet pipe 44. A collection baffle 46 is positioned downstream of the outlet pipe 44 to prevent the surface foam 42 from flowing past the outlet 45 presented by the pipe 44. The collection baffle 46 has two sections: a downwardly extending section 48 and an upstream extending section 50. The collection baffle 46 creates a quiescent region isolated from the flow of stock through the vessel 22 where surface foam 42 may accumulate.

Foraminous plates are positioned within the body section 28 to define transverse battles 52 which serve to mix the foam throughout the stock, thus assuring that all the stock comes in contact with the air bubbles making up the foam 40.

Because the foam 40 is so much lighter than the stock, it rises relatively rapidly through the stock. This rising of the foam provides the opportunity to inject additional air into the vessel to increase the amount of ink particles which are removed from the stock as it passes through the vessel 22.

Additional air injection ports 53 shown in FIG. 1 are spaced along the bottom 54 of the vessel 22. Each injection port 53 may extend into the volume of the vessel 22 to position the air inlet within the cylindrical body portion 28 more or less spaced from the top 43 of the vessel 22. Above and downstream of each injection port 53 is a foam outlet pipe 56 and a corresponding outlet baffle 58. A stock outlet baffle 59 extends downwardly from the foam outlet baffle 58 nearest the stock outlet 30.

Control of the rate at which foam is drawn from the vessel 22 is critical if foam and not stock is to be withdrawn. To accomplish this function a series of sensors 60. shown in FIGS. 1–2, is positioned one in front of each foam outlet 44, 56. These sensors 60 consist of a magnetic float 62 which moves along a magnetically active rod 64 which passes through the top 43 of the vessel 22 and connects with a sensing magnet 66. The position of the magnetic float 62 along the rod 64 affects the properties of the sensing magnet 66 exterior to the vessel 22. A controller 68 receives information about the position of the magnetic floats and uses this information to control the position of a series of valves 70 which control the amount of foam which is drawn off from the top of the vessel 22. The controller also controls the amount of stock flowing to the vessel 22 and/or the amount of air injected into the vessel. Injected air is controlled by adjustment of valves 72 in the air inlet lines leading to the air injection ports 53.

The precise location of the interface between the surface foam 42 and the stock may be somewhat indistinct because air bubbles are also moving up through the stock. Thus the magnetic floats 62 must be sufficiently light, that is of a sufficiently low specific gravity, that they will float in stock even though some air is reducing the density of the stock locally.

Because the vessel 22 is sealed, the movement of the surface foam 42 from the vessel 22 into the outlet pipes 44, 56 is affected by system pressure or by a vacuum drawn on the foam outlets 44, 56. Preferably pressures above atmospheric will be used as this minimizes the amount of equipment required and reduces costs, as vacuum equipment is typically more expensive to operate then compressing equipment.

The outlet pipes 44, 56 may be connected to a header 74 and lead to a cyclone 76. The cyclone separates the air from the foam leaving a waste stream containing some fiber together with the ink particles suspended in water. A twin-wire press (not shown) is used to dewater the waste stream which is then disposed of, typically as boiler fuel.

The deinking system 20 may alternatively be outfitted with a stock infeed header 78, as shown in phantom view in FIG. 1, which allows the recirculation of part of the feed stock which is injected along with the air through the injection ports 53.

It may be desirable to withdraw the stock from the vessel 22 and mix it with air in a mixer before injecting the stock and air into the vessel 22. This may be accomplished with a pump and mixer, the pump supplying the means for withdrawing the stock and injecting the stock after it has been mixed with air.

Yet another variation on the system 20 shown in FIG. 1 is to inject the air from the top 43 or the sides of the cylindrical section of the vessel 22 with or without recirculated stock with the injected air.

An alternative embodiment deinking system 120 is shown in FIG. 3. This system is an improvement on the device shown in FIG. 2 of the U.S. Pat. No. 5,273,624. The deinking system 120 has an inlet pipe 124 which has circumferential turbulence-generating baffles 138, downstream of an air injection port 137 and a foam recirculation port 139. The air injection port 137 and the foam recirculation port mix air and recirculated foam into the inlet 124. The inlet pipe 124 leads to a conical inlet section 126 which is followed by a cylindrical body section 128. Foraminous baffles 152 extends across the cylindrical body 128 and help mix the air with the stock. A foam outlet pipe 134 is positioned approximately in the middle of the cylindrical body section 128 of the vessel 122. A foam collection baffle 146 is positioned downstream of the foam outlet 134. The foam collection baffle 146 extends across the cylindrical section 128 and down to just above the geometric center of the cylindrical section and a portion 150 of the baffle then extends upstream beneath the outlet 134. The baffle section 150 extends downwardly to approximately the centerline of the cylindrical body section 128.

The cylindrical body section 128 ends in a conical section 132. The conical section 132 has an outlet 133 for the cleaned stock. This outlet 133 is covered by a two part baffle 151. The two part baffle 151 has a first part 153 which extends almost directly upstream from the outlet 132 and forms a shelf which collects any foam which passes by the foam collection baffle 146. Depending from the shelf is a second portion 157 of the baffle 151 which blocks the entrance to the outlet 133 forcing the stock to flow down and under the baffle portion 157.

A recirculation port 159 is positioned above the foam collection portion 153 of the baffle 151. The recirculation port 159 opens to a recirculation line 163 which has a valve 161 which controls the amount of stock which is recirculated to the foam recirculation port 139 at the inlet 124 of the vessel 122. Flow through the foam outlet pipe 134 is controlled by a valve 171 and leads to a cyclone 173 which separates the water, fiber and ink particles from the air. A sensor to monitor the interface between the surface foam 142 and the stock in the vessel 122 is not required because the valve 161 can be adjusted so the flow of material through the foam outlet pipe is of the desired consistency. However a floatation sensor could be employed if desired.

It should be understood that a deinking system 20 such as shown in FIG. 1 might typically have an inlet pipe 30 which is twenty-four inches in diameter and ten feet long and connect to a vessel 22 which has a cylindrical body section 32 which is about eighty-two inches in diameter and about twenty-five feet long. Typical flow in such a unit may be about 6,000 gallons per minute.

It should be understood that although the air injection ports 53 in FIG. 1 are shown positioned to inject air near the bottom 54 of the vessel 22, the injection ports may extend upwardly into the vessel 22 part way towards the top 43 of the vessel 22. Alternatively the injection ports 53 may extend downwardly from the top of the vessel 22 some distance towards the bottom 54 of the vessel 22.

It should be understood that the air which is injected into the vessel 22 can be mixed with the stock inside the vessel or the air can be mix with the stock outside the vessel and the air and stock injected premixed into the vessel.

It is understood that the invention is not limited to the particular construction and arrangement of parts herein illustrated and described, but embraces such modified forms thereof as come within the scope of the following claims.

We claim:

1. A foam floatation module for separating ink particles by floatation from a stock fed therethrough, the module comprising:

a sealed horizontally disposed, substantially cylindrical container, the container having a generally conical shell forming a stock inlet at one end and a generally conical shell forming a stock outlet at the other end;

a quantity of papermaking stock, mixed with air and containing ink particles flowing through the container;

the container having an uppermost portion and a foam outlet connected to the uppermost portion;

a first baffle extending downward from the uppermost portion of the container positioned near the foam outlet and located between the foam outlet and the stock outlet and having a portion which extends towards the stock inlet;

an outlet baffle extending across and spaced from the stock outlet and extended to the conical shell of the stock outlet; and the container further including a foam recirculation outlet located above the outlet baffle and said foam recirculation outlet communicating with a recirculation conduit extending from above the outlet baffle to the stock inlet.

2. The apparatus of claim 1 further comprising at least one foraminous baffle extending substantially across the substantially cylindrical container and positioned between the foam outlet and the stock inlet.

3. A deinking apparatus for removing ink particles from paper stock employing a froth floatation process comprising:

an enclosed vessel having a bottom, a top, a stock inlet on a first side of said vessel, a stock outlet on an opposite side of the vessel from said stock inlet and a plurality of foam outlets communicating with the top of the vessel, each foam outlet being spaced along the top of the vessel, and spaced downstream towards the stock outlet from one of a plurality of air injection locations;

a quantity of paper stock created from recycled paper, the stock containing between about 0.5 percent and about 5 percent fiber with one or more reagents that are capable of supporting formation of a foam which attracts ink particles to walls formed by bubbles making up the foam;

a quantity of air mixed with the stock residing in the vessel, forming the foam;

a plurality of automatic controllable valves, one controlling each foam outlet;

a plurality of sensors, one for each foam outlet, and positioned within the vessel and upstream of each foam outlet, each sensor including a float for locating the interface between the stock and the foam; and a controller in data receiving relationship with the sensors and controlling relationship with the automatic controllable valves controlling the flow of foam from the vessel, so that an interface between the foam and the stock is maintained spaced from the top of the vessel.

4. The apparatus of claim 3 wherein the vessel has a baffle for each foam outlet, each baffle spaced away from each foam outlet towards the stock outlet and extending from the top of the vessel to approximately the interface between the surface foam and the stock.

5. The apparatus of claim 4 wherein each baffle extends towards the stock inlet as it extends to approximate the interface between the foam and the stock.

6. The apparatus of claim 3 wherein the vessel is a horizontal tube having a circular cross section and wherein the stock inlet joins the tube by a conical transition section.

7. The apparatus of claim 3 wherein the stock outlet joins the cylindrical tube by a conical transition section.

8. The apparatus of claim 3 wherein there are at least three air injection locations in the vessel.

9. A foam floatation module for separating ink particles by floatation from a stock fed therethrough, the module comprising:

a sealed horizontally disposed, substantially cylindrical container, the container having a generally conical shell forming a stock inlet at one end and a generally conical shell forming a stock outlet at the other end;

the container having an uppermost portion and a foam outlet connected to the uppermost portion;

a first baffle extending downward from the uppermost portion of the container positioned near the foam outlet and located between the foam outlet and the stock outlet and having a portion which extends towards the stock inlet;

an outlet baffle extending across and spaced from the stock outlet and extending to the stock outlet; and the container further including a foam recirculation outlet located above the outlet baffle and said foam recirculation conduit communicating with a recirculation conduit extending from the foam recirculation outlet to the stock inlet.

10. The apparatus of claim 9 further comprising at least one foraminous baffle extending substantially across the substantially cylindrical container and positioned between the foam outlet and the stock inlet.

11. A deinking apparatus for practicing a froth floatation process comprising:

an enclosed vessel having a bottom, a top, a stock inlet on a first side of said vessel, a stock outlet on an opposite side of said vessel from said stock inlet and a plurality of foam outlets communicating with the top of the vessel, each foam outlet being spaced along the top of the vessel, and spaced downstream towards the stock outlet from one of a plurality of air injection locations;

a plurality of automatic controllable valves, one controlling each foam outlet;

a plurality of sensors, one for each foam outlet, and positioned within the vessel and upstream of each foam outlet, each sensor including a float for locating an interface between stock and foam;

a controller in data receiving relationship with the sensors and controlling relationship with the automatic controllable valves for controlling flow of foam from the vessel, so that an interface between foam and stock can be maintained spaced from the top of the vessel.

12. The apparatus of claim 11 wherein the vessel has a baffle for each foam outlet, each baffle spaced away from each foam outlet towards the stock outlet and extending from the top of the vessel downwardly.

13. The apparatus of claim 11 wherein each baffle extends towards the stock inlet in addition to extending downwardly.

14. The apparatus of claim 11 wherein the vessel is a horizontal tube having a circular cross section and wherein the stock inlet joins the tube by a conical transition section.

15. The apparatus of claim 11 wherein the stock outlet joins the cylindrical tube by a conical transition section.

16. The apparatus of claim 11 wherein there are at least three air injection locations in the vessel.

* * * * *